United States Patent
Yamada

[11] Patent Number: 6,067,048
[45] Date of Patent: May 23, 2000

[54] RADAR APPARATUS

[75] Inventor: Yukinori Yamada, Shizuoka-ken, Japan

[73] Assignee: Toyota Jidosha Kabushiki Kaisha, Japan

[21] Appl. No.: 09/247,854

[22] Filed: Feb. 11, 1999

[30] Foreign Application Priority Data

Feb. 12, 1998 [JP] Japan ................................. 10-029788

[51] Int. Cl.⁷ .................................................. G01S 3/16
[52] U.S. Cl. ............................ 342/382; 342/25; 342/379
[58] Field of Search ................................ 342/5, 25, 81, 342/39, 382, 379, 368

[56] References Cited

U.S. PATENT DOCUMENTS

| | | | |
|---|---|---|---|
| 3,825,928 | 7/1974 | Williams | 343/5 R |
| 3,842,417 | 10/1974 | Williams | 343/5 R |
| 3,877,031 | 4/1975 | Mailloux et al. | 343/778 |
| 4,257,050 | 3/1981 | Ploussios | 343/854 |
| 4,937,584 | 6/1990 | Gabriel et al. | 342/378 |
| 5,831,582 | 11/1998 | Muhlhauser et al. | 343/753 |

FOREIGN PATENT DOCUMENTS

| | | |
|---|---|---|
| 5-75324 | 3/1993 | Japan . |
| 6-138205 | 5/1994 | Japan . |

*Primary Examiner*—Thomas H. Tarcza
*Assistant Examiner*—Dao L. Phan
*Attorney, Agent, or Firm*—Finnegan, Henderson, Farabow, Garrett & Dunner, L.L.P.

[57] ABSTRACT

The object of the invention is to suppress relative power of grating lobes in electronic scanning radar apparatus. This radar apparatus is a radar apparatus comprising a transmitting antenna and a receiving antenna, the receiving antenna being an array antenna having a plurality of antenna elements, the radar apparatus being adapted to effect electronic scanning of an antenna beam of the receiving antenna, wherein each of the plurality of antenna elements is comprised of a plurality of elemental antennas, so as to have a predetermined directional pattern, and wherein a synthetic pattern of the directional pattern of each antenna element and a directional pattern of the transmitting antenna has a depressed shape of relative power at an angle where a grating lobe of the receiving antenna appears.

3 Claims, 9 Drawing Sheets

RADAR APPARATUS

BACKGROUND OF THE INVENTION

1. Field of the Invention

The present invention relates to a radar apparatus of an electronic scanning method using an array antenna as a receiving antenna and, more particularly, to a radar apparatus of the electronic scanning method suited for mounting on a vehicle.

2. Related Background Art

In the array antenna, supposing the distance between the antenna elements is d and the wavelength of transmit and receive electromagnetic waves is $\lambda$, when $d/\lambda>1$, grating lobes appear in the range of the visible zone ($-90°<\theta<+90°$) because of the periodicity of Fourier series. Here, $\theta$ is the directional angle. If the grating lobes are left in the visible zone as they are, a target might be detected erroneously. It is thus desirable to eliminate the grating lobes from the visible zone or to adequately suppress the relative power of the grating lobes with respect to the main beam.

It is possible to shift the grating lobes out of the visible zone if the distance d between the antenna elements is made sufficiently smaller than the wavelength $\lambda$. The wavelength $\lambda$ and the distance d between the antenna elements are, however, under restrictions of other various conditions and it is, therefore, hard to change them without difficulties.

On the other hand, Japanese Laid-open Patent Application No. 6-138205 discloses the technology for providing a separate auxiliary antenna in order to suppress the receiving level of the sidelobes and it is also possible to suppress the relative power of the grating lobes by making use of this technology.

The addition of the auxiliary antenna, however, results in increasing the number of components, the size of the apparatus, and so on. This is a significant issue, particularly, in the on-vehicle radar apparatus which is desirably compact and lightweight.

SUMMARY OF THE INVENTION

The radar apparatus of the present invention has been accomplished in order to solve this problem and is a radar apparatus comprising a transmitting antenna and a receiving antenna, the receiving antenna being an array antenna having a plurality of antenna elements, the radar apparatus being adapted to effect electronic scanning of an antenna beam of the receiving antenna, wherein each of the plurality of antenna elements is comprised of a plurality of elemental antennas, so as to have a predetermined directional pattern, and wherein a synthetic pattern of the directional pattern of each antenna element and a directional pattern of the transmitting antenna has a depressed shape of relative power at an angle where a grating lobe of the receiving antenna appears.

Since each of the antenna elements is the array antenna, the fixed directional pattern of the antenna elements can be set in a desired pattern. By properly setting the fixed directional pattern of each antenna element, the synthetic pattern of the directional pattern of each antenna element and the directional pattern of the transmitting antenna can be formed in the depressed shape of relative power at an angle where a grating lobe of the receiving antenna appears. This can adequately suppress the relative power of the grating lobes even though the grating lobes due to the array antenna of the receiving antenna appear in predetermined angular ranges.

When the transmitting antenna is constructed of a array antenna, similar to the antenna elements of the receiving antenna, the fixed directional pattern of the transmitting antenna can also be set freely to some extent. This increases degrees of freedom of design of the synthetic directional pattern as a combination of the fixed directional pattern of the transmitting antenna with the fixed directional pattern of the antenna elements composing the receiving antenna as described above.

The scanning of the antenna beam of the receiving antenna is desirably carried out according to a digital beamforming operation. In that case, a directional angle of a main beam is desirably an angle obtained by correcting a directional angle of a main beam calculated under the assumption that each of the antenna elements composing the receiving antenna is comprised of non-directional elemental antennas, with a correction value previously determined according to the angle.

Because of the fixed directional pattern of each antenna element of the receiving antenna or the fixed directional pattern resulting from synthesis thereof with the fixed directional pattern of the transmitting antenna, there appears deviation between an actual angle and the angle of the main beam resulting from the digital beamforming synthesis under the assumption that these fixed directivities are almost null, but the deviation is compensated by the correction.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
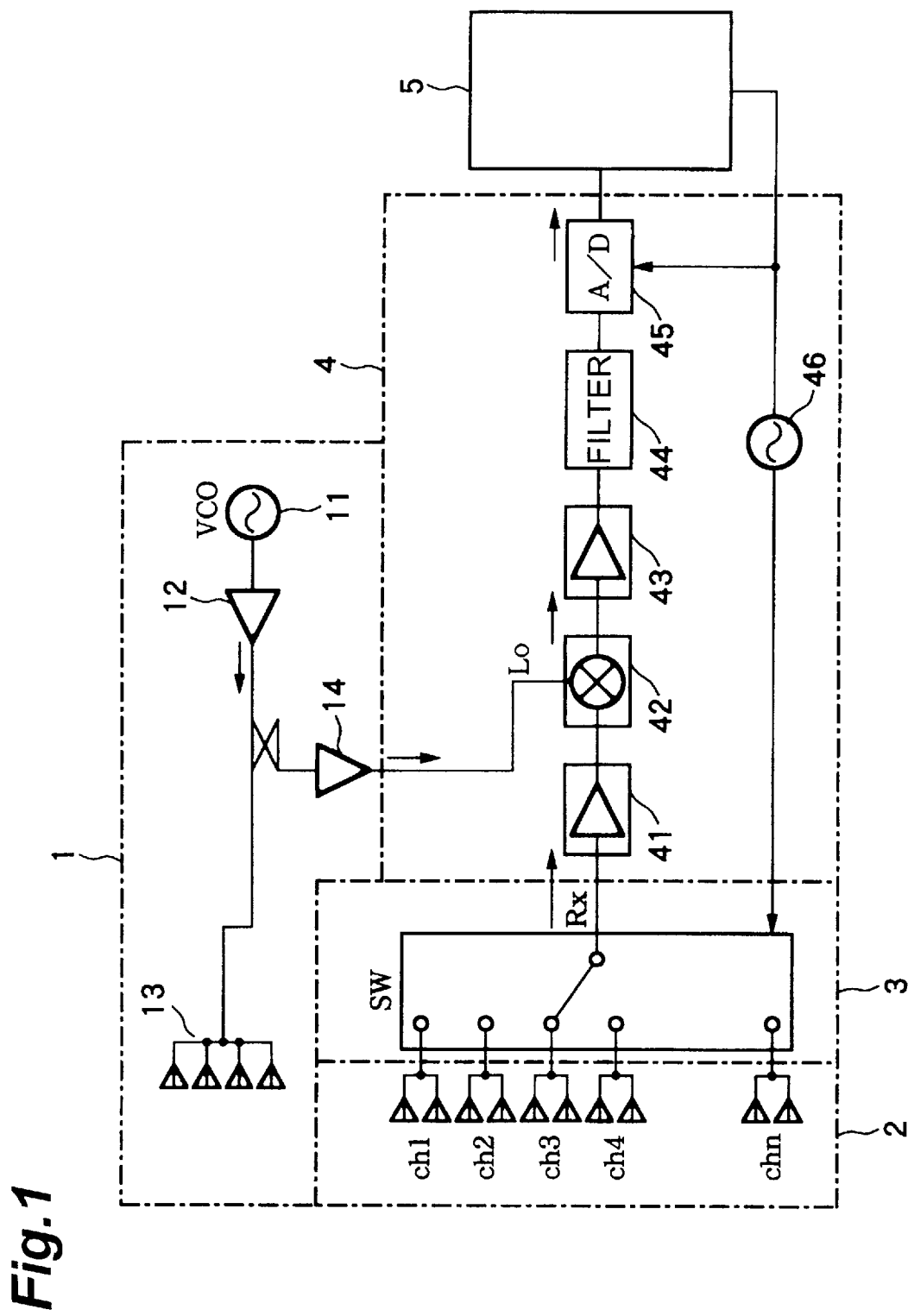
FIG. 1 is a structural diagram to show the radar apparatus as an embodiment of the present invention.

FIG. 1 is a structural diagram to show the radar apparatus as an embodiment of the present invention. This radar apparatus is an FM-CW radar apparatus using a transmit signal of a frequency-modulated (FM) continuous wave (CW) and DBF radar apparatus arranged to perform the digital beamforming operation in the receiving antenna. This radar apparatus is a so-called on-vehicle radar apparatus mounted on an automobile, which is arranged to detect a distance to a vehicle running ahead, relative velocity thereof, and so on. The result of detection of this radar apparatus is utilized as control information of running of car or the like. The transmit radio wave is a millimeter wave.

In the conventional ordinary DBF radar apparatus, an RF amplifier, a mixer, etc. are provided every antenna element, whereas this radar apparatus has the structure in which the whole system includes a set of analog devices including the RF amplifier, the mixer, and so on by use of a changeover switch.

This radar apparatus has a transmit section 1, a receiving array antenna 2, a changeover switch 3, a receive section 4, and a digital signal processing section 5.

The transmit section 1 is composed of a voltage-controlled oscillator 11 having the center frequency of f0 (for example, 76 GHz), a buffer amplifier 12, a transmitting antenna 13, and an RF amplifier 14. The oscillator 11 outputs a signal resulting from triangular wave modulation of frequency modulation width ΔF on a carrier wave of the frequency f0 according to control voltage outputted from a dc power supply for modulation, not illustrated; that is, the oscillator 11 outputs a modulated wave (transmit signal) of the frequency f0±ΔF/2. The modulated wave is amplified by the buffer amplifier 12 to be radiated as an electromagnetic wave from the transmitting antenna 13. A part of the transmit signal is amplified by the RF amplifier 14 and is outputted as a local signal for detection of received signals. The transmitting antenna 13 is composed of four elemental antennas in order to provide the transmitting antenna with a desired directivity in the horizontal direction.

The receiving array antenna 2 consists of n antenna elements corresponding to respective channels including the first channel (CH1) to the nth channel (CHn). Each antenna element is composed of two elemental antennas and is provided with a fixed directivity in the horizontal direction as the transmitting antenna 13 was. The changeover switch 3 has n input terminals and one output terminal, one antenna element of the array antenna 2 being connected to each input terminal. The output terminal is arranged to be connected to either one of the input terminals and the connection is regularly changed over by changeover signals (clock signals). The changeover of connection is effected electrically on circuitry.

The receive section 4 has an RF amplifier 41, a mixer 42, an amplifier 43, a filter 44, an A/D converter 45, and an oscillator 46 for generation of the changeover signals. A signal outputted from the output terminal of the changeover switch 3, i.e., a signal received by either antenna element of the array antenna 2, is amplified by the RF amplifier 41 to be mixed with a part of the transmit signal from the RF amplifier 14, in the mixer 42. This mixing downconverts the received signal to generate a beat signal being a difference signal between the transmitted signal and the received signal.

In the triangular wave modulation FM-CW method, the following relations hold where the beat frequency at the relative velocity of zero is fr, the Doppler frequency based on the relative velocity is fd, the beat frequency in frequency-increasing intervals (up intervals) is fb1, and the beat frequency in frequency-decreasing intervals (down intervals) is fb2.

$$fb1=fr-fd \qquad (1)$$

$$fb2=fr+fd \qquad (2)$$

Therefore, fr and fd can be calculated from next Equations (3), (4) by separately measuring the beat frequencies fb1 and fb2 in the up and down intervals of the modulation cycles.

$$fr=(fb1+fb2)/2 \qquad (3)$$

$$fd=(fb2-fb1)/2 \qquad (4)$$

With fr and fd calculated, the range R and velocity V of the target can be calculated according to next Equations (5), (6).

$$R=(C/(4 \cdot \Delta F \cdot fm)) \cdot fr \qquad (5)$$

$$V=(C/(2 \cdot f0)) \cdot fd \qquad (6)$$

In these equations, C is the speed of light and fm is the modulation frequency of FM.

The beat signal is input through the amplifier 43 and low-pass filter 44 into the A/D converter 45 to be converted to a digital signal at the timing of the output signal from the oscillator 46, i.e., at the timing of the clock signal for effecting the changeover of connection at the changeover switch 3.

The digital signal processing section 5 performs digital beamforming (DBF) using the digital beat signals from the A/D converter 45. Specifically, the digital signal processing section 5 converts the digital receive signals of the respective channels to phases and amplitudes according to a certain rule and synthesizes all the channels. This can form a directional pattern of the receiving antenna 2 in an arbitrary direction and in an arbitrary shape. A great feature of the DBF is that once signals of all the antenna elements (all the receiving channels) are captured as digital signals, a beam can be synthesized in an arbitrary direction, based thereon, and, therefore, a plurality of beams can be formed based on one capturing operation of signals.

Figure 2:
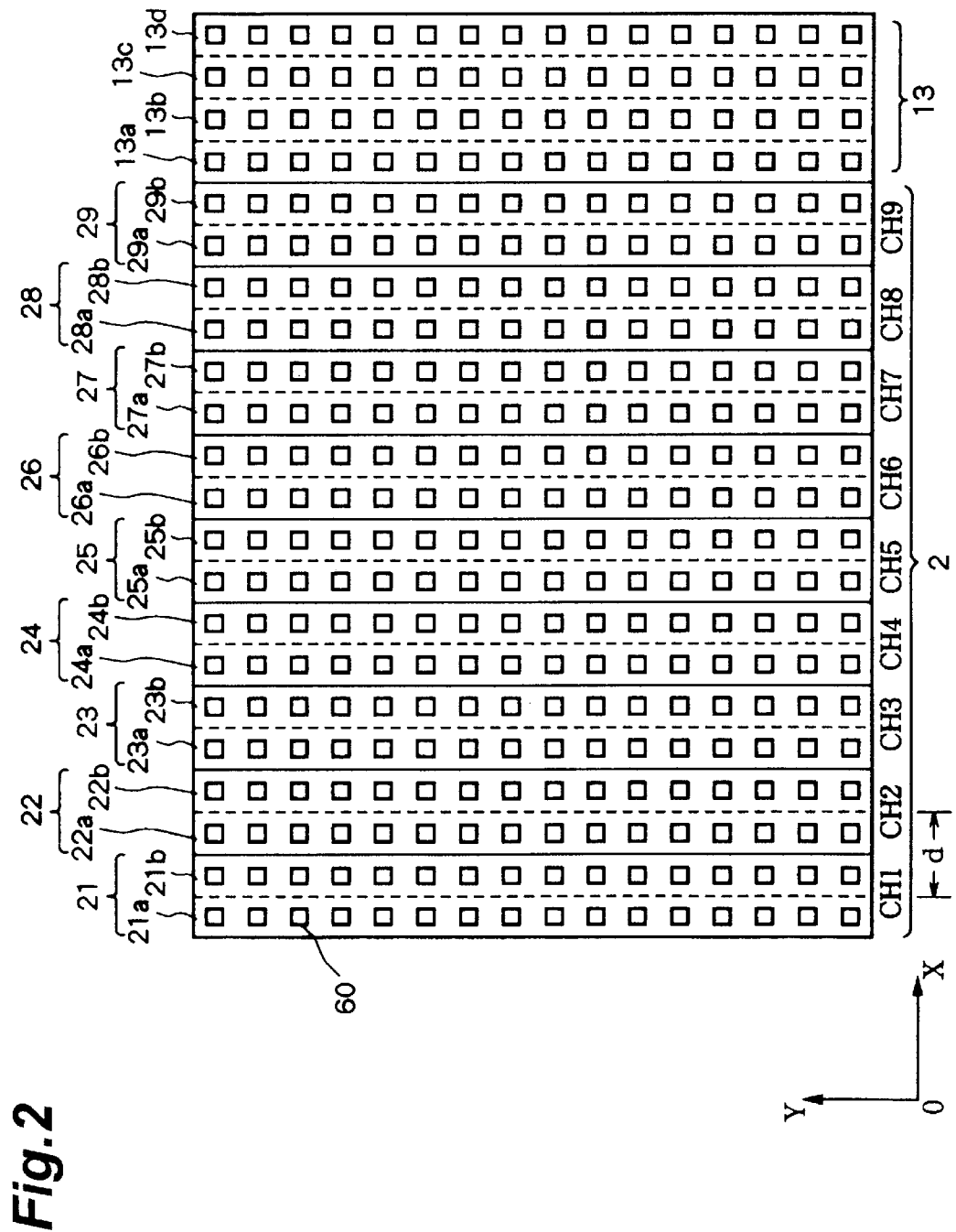
FIG. 2 is a plan view to show the structure of the receiving antenna and transmitting antenna.

FIG. 2 is a plan view to show the external view and structure of the transmitting antenna 13 and receiving antenna 2. In this example, the value of n, which is the number of antenna elements in the receiving antenna 2, i.e., the number of channels, is 9.

Each antenna element 21 to 29 of the receiving antenna 2 consists of two elemental antennas 21a, 21b, 22a, 22b, ..., 29a, 29b juxtaposed in the horizontal direction (in the X-direction), each elemental antenna being a line of sixteen patch antennas 60 aligned in the vertical direction (in the Y-direction). The transmitting antenna 13 consists of four elemental antennas 13a to 13d juxtaposed in the horizontal direction (in the X-direction), each elemental antenna 13a to 13d being a line of sixteen patch antennas aligned in the vertical direction (in the Y-direction). A feeder connected to each patch antenna 60 is omitted from the illustration.

A single patch antenna demonstrates little directivity, but an array of patch antennas, connected to each other with adjusting lengths of feeders, can be provided with the directivity as a whole.

Figure 3:
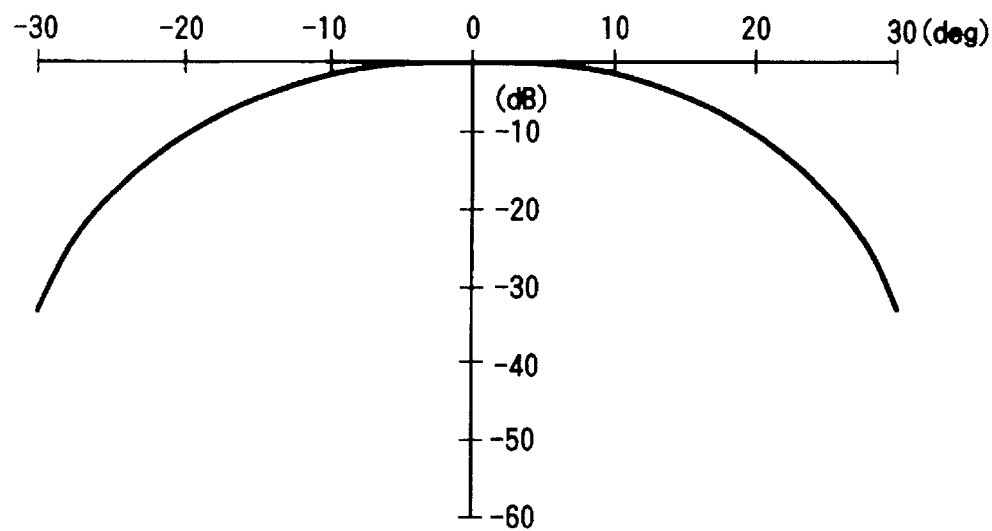
FIG. 3 is a graph to show the directional pattern of the antenna elements composing the receiving antenna.

FIG. 3 is a characteristic diagram to show a directional pattern of each antenna element 21 to 29 in the horizontal direction (in the X-direction of FIG. 2). As apparent from this figure, the gentle directivity is obtained with a wide beam width in the horizontal direction, because two elemental antennas are arrayed in the horizontal direction.

Figure 4:
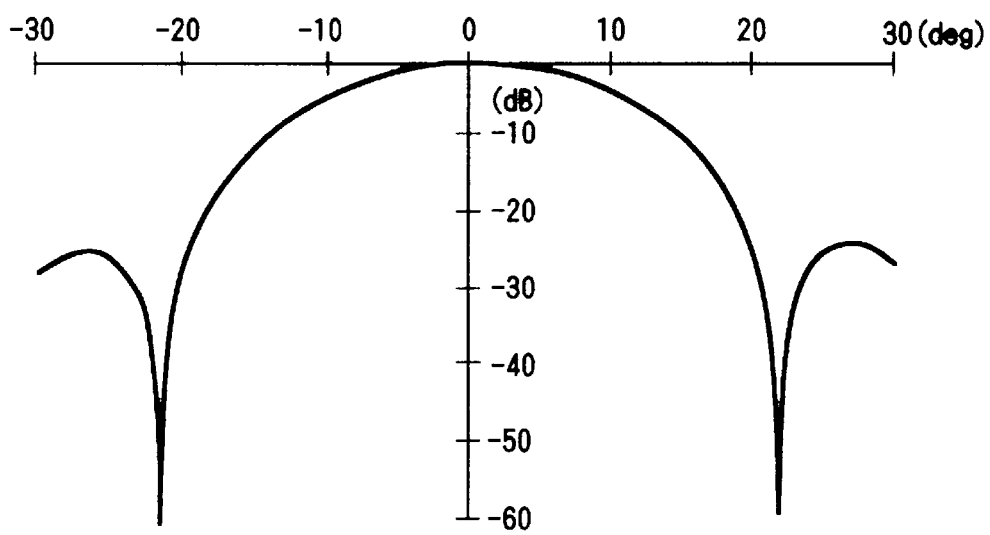
FIG. 4 is a graph to show the directional pattern of the transmitting antenna.

FIG. 4 is a characteristic diagram to show a directional pattern of the transmitting antenna 13 in the horizontal direction (in the X-direction of FIG. 2). Since the four elemental antennas 13a to 13d are arrayed in the horizontal direction, the directivity is obtained with a narrower beam width of the main beam in the horizontal direction than the directional pattern of each antenna element 21 to 29 of the receiving antenna 2.

Figure 5:
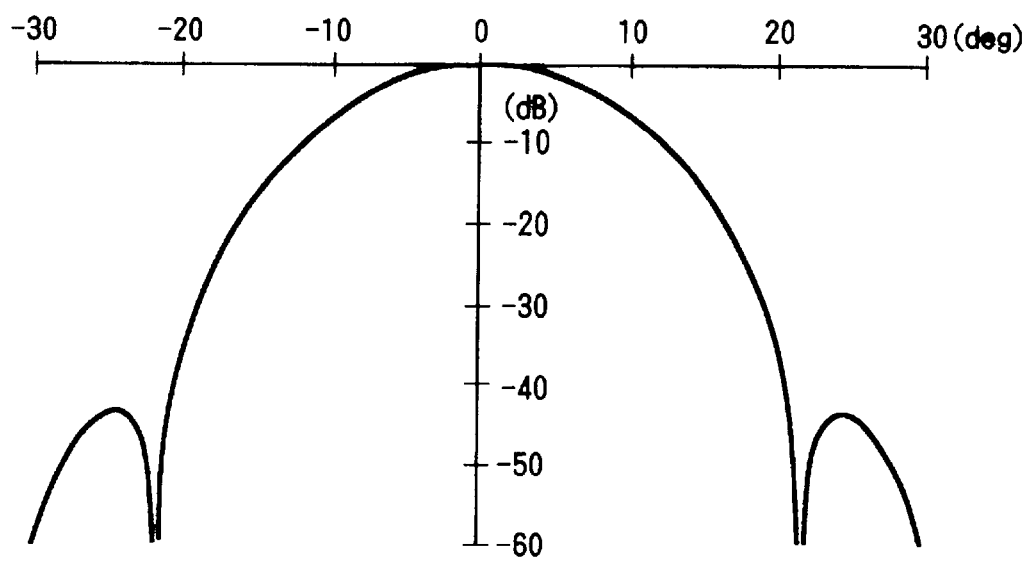
FIG. 5 is a graph to show the synthetic pattern of the directional pattern of the antenna elements composing the receiving antenna and the directional pattern of the transmitting antenna.

FIG. 5 is a synthetic pattern of the directional pattern of each antenna element 21 to 29 of the receiving antenna 2 and the directional pattern of the transmitting antenna 13.

Figure 6:
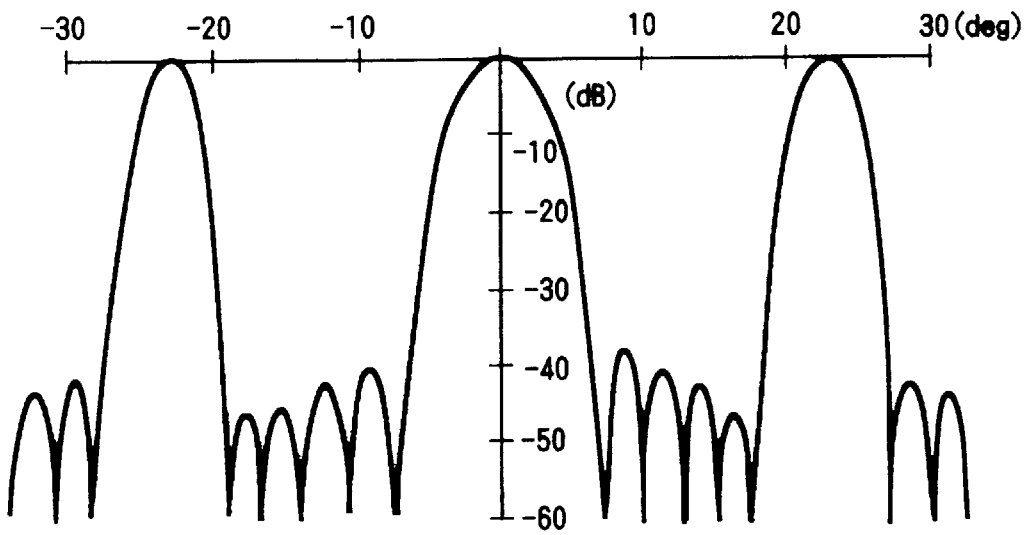
FIG. 6 is a graph to show the directional pattern by the DBF synthesis.

Next described is a directional pattern of the receiving antenna 2 based on the DBF synthesis. FIG. 6 is the directional pattern of the receiving antenna 2 when the DBF synthesis operation is carried out under the assumption that neither each antenna element of the receiving antenna 2 nor the transmitting antenna 13 has the directivity; particularly, a directional pattern when the DBF synthesis is carried out so that the main beam comes in the direction normal to the array surface of the patch antennas (the XY plane of FIG. 2). As seen from this figure, grating lobes appear with the same relative power as the main beam, at angles of approximately ±23°. With these grating lobes left as they are, it is impossible to discriminate a target existing at the angle (the direction) of the grating lobe from a target existing at the angle of the main beam (0° in this case).

Figure 7:
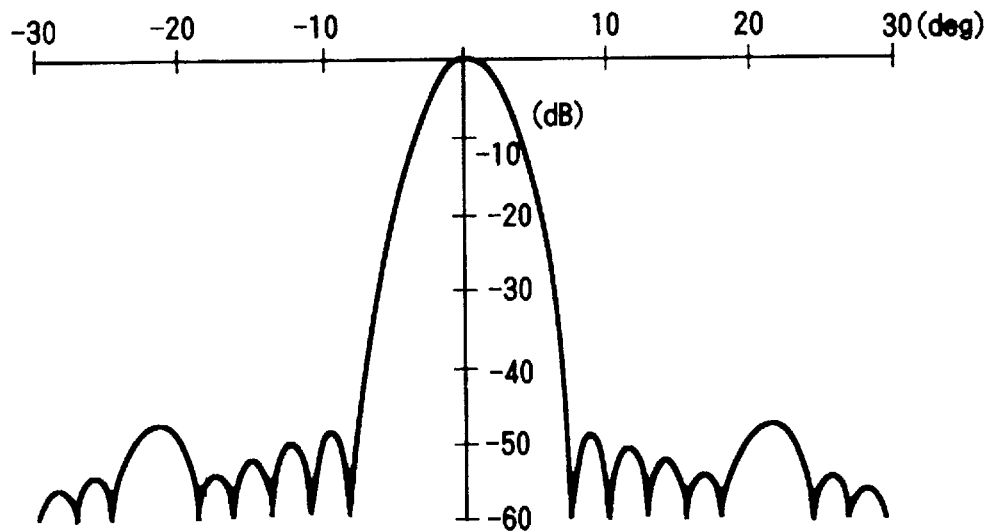
FIG. 7 is a graph to show the final DBF synthetic pattern resulting from synthesis of the synthetic pattern of FIG. 5 with the directional pattern of FIG. 6.

In the present embodiment each antenna element of the receiving antenna 2, and the transmitting antenna 13 have the respective directivities, whereby the synthetic directional pattern as illustrated in FIG. 5 is prepared as a fixed directional pattern. Therefore, the final DBF synthetic pattern is the directional pattern as illustrated in FIG. 7, which is obtained by synthesis of the fixed directional pattern illustrated in FIG. 5 with the theoretical DBF synthetic pattern illustrated in FIG. 6.

As apparent from this figure, the relative power is suppressed sufficiently of the grating lobes on either side of the main beam. The angles of the grating lobes relative to the main beam are determined by values of the wavelength λ and the distance d between adjacent antenna elements 21 to 29. Therefore, the fixed synthetic pattern is so adjusted that bottoms of the directional pattern can be formed at the angles so as to adequately decrease the relative power at the angles of appearance of the grating lobes.

The transmitting antenna 13 may also be arranged to have the directivity by the other methods than the array configuration.

Next described is the overall operation of the radar apparatus of the present embodiment.

Let $f_{TX}$ be the frequency of the transmitted signal, $f_{RX}(i)$ be frequencies of the received signals, and fb(i) be frequencies of the beat signals. Then the frequencies fb(i) of the beat signals can be expressed as follows.

$$fb(i)=|f_{TX}-f_{RX}(i)| \quad (7)$$

Here, i represents the numbers of the receiving channels, i=1, 2, ..., n.

For example, in an example of the radar apparatus to be mounted on automobiles, $f_{TX} \approx f_{RX}(i) \approx 76$ GHz, and thus fb(i)<100 kHz approximately. When at this time the frequency fsw of the clock signals, which are the changeover signals of the changeover switch 3, is set to be several MHz to several hundred MHz, the mixer 42 downconverts the received waves (of the 76 GHz band) from the respective channels (antenna elements) every several hundred to several thousand cycles, to generate fb(i) repetitively in order from 1 to n.

Since in the present embodiment the changeover of the channels is carried out at the frequency fsw in the changeover switch 3, the beat signals obtained in the mixer 42 are chopped beat signals. This chopped beat signal of each channel is supplied via the amplifier 42 and filter 44 to the A/D converter 45.

Since the A/D converter 45 performs A/D conversion in synchronism with the changeover timing of the changeover switch 3, one-to-one correspondence is established between the digital data after the A/D conversion and the channels. The timing of the A/D conversion in each channel slightly lags the changeover timing of the changeover switch 3, so as to be at the center of each connection period.

Next, the digital signal processing section 5 accumulates a certain fixed amount of consecutive data of the nine channels in nine lines of buffers, for example, 1024 points for every channel. Each channel and each buffer are in one-to-one correspondence, and data of the chopped digital beat signal of the first channel at 1024 points is stored in the first line of the buffer. Likewise, the digital beat signals of the second channel to the ninth channel are stored in the second line to the ninth line of the buffers.

In the digital signal processing section 5, the data strings separated in the respective channels are processed as in the case of the conventional DBF radar apparatus that downconverts the data in parallel for the respective channels. Specifically, the FFT operation is carried out, thereafter the phase rotation operation is applied to effect the synthesis of beams at respective directional angles, and the distance to an object and the velocity of the object are computed based on above Eqs. (5), (6) from the beat signal frequency of each beam. Then these results are totally evaluated to finally recognize the position and velocity of the object.

Figure 8:
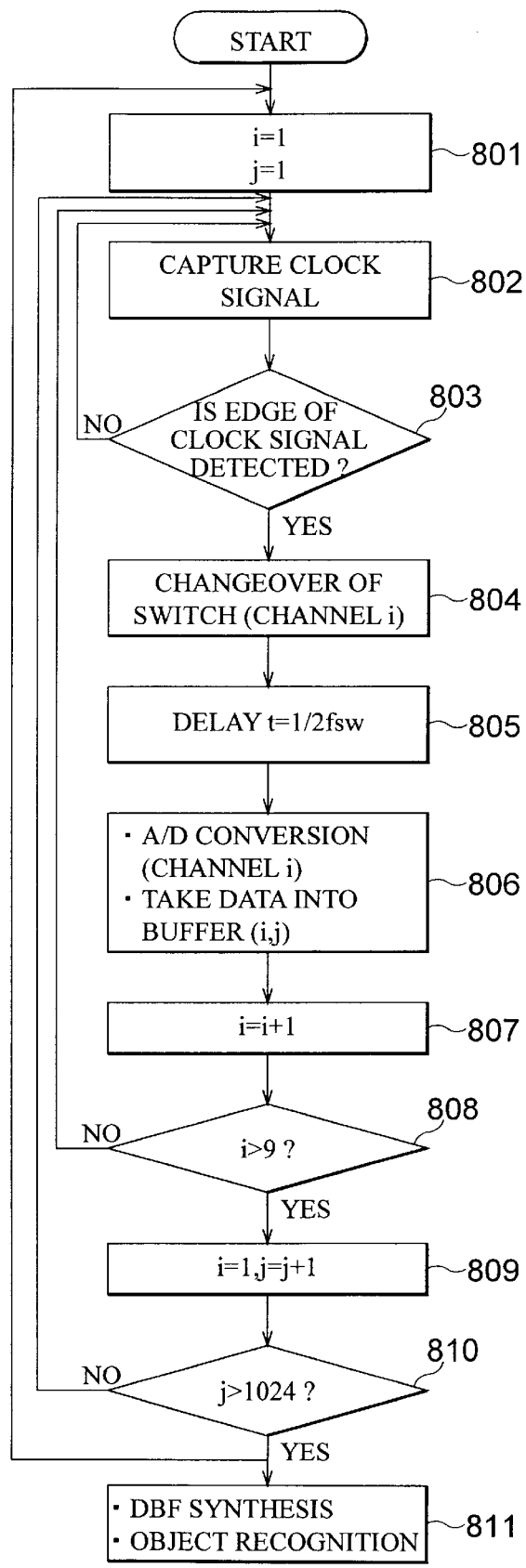
FIG. 8 is a flowchart to show the operation of the present embodiment.

FIG. 8 is a flowchart to show the whole of sequential flow concerning the operation of the radar apparatus of the present embodiment described above in detail. Letting i be a channel number and j be a data sampling number, first, step 801 is to set i=1 and j=1. Then a clock signal fsw is taken in (step 802) and with detection of an edge of the clock signal, the output terminal of the changeover switch 3 is switched to the input terminal of CHi (steps 803, 804). Since i=1 at present, the output terminal is connected to the input terminal of CH1.

With a delay of the time t equal to a half of the period of the clock signal (t=½ fsw), the A/D converter 45 then carries out the A/D conversion operation and the digital data produced by the operation is taken into the digital signal processing section 5 (steps 805, 806). Since i=1 and j=1 at present, the first sample data is stored in the first line of buffer.

After that, an operation of i=i+1 is carried out (step 807) and the flow then returns to step 802 to repeat the operations of steps 802 to 807 before i>9 is satisfied (step 808). This repetition results in storing the first sampling data in each buffer of the first to the ninth lines in the digital signal processing section 5.

When i>9 is satisfied at step 808, the flow moves to step 809 to set i=1 and j=j+1. Since j=1 heretofore, j=2 herein.

Whether j>1024 is determined at step 810, and the operations of steps 802 to 809 are repeated before j>1024 is satisfied. This repetition results in storing all the first to the 1024th sampling data in the respective buffers of the first to the ninth lines in the digital signal processing section 5.

After that, the DBF synthesis is carried out and recognition of an object is further carried out based on the result of the synthesis (step 811).

Meanwhile, in this embodiment, the data is not one obtained at the same time in an accurate sense, because the measuring time of each channel is shifted by 1/fsw from the preceding. When fsw>>fb(i) holds well, for example, when fsw>fb(i)×1000 approximately holds, the data can be considered to be one at the same time and can be synthesized. If the condition is not met, it is desirable to apply correction according to the frequency for a rotation amount (directional angle) of phase rotation channel by channel.

Correction amounts φ are given as follows with respect to the reference of CH1 (without correction).

$$\phi = (fb(i)/fsw) \times (i-1) \times 2\pi \quad (8)$$

where i=1, 2, ..., n.

Next described is the angular correction of angle of the main beam in the DBF synthesis. In the present embodiment, the relative power of the grating lobes in the directional pattern of the receiving antenna 2 by the DBF synthesis (see FIG. 6) is suppressed (see FIG. 7) by the synthetic pattern (see FIG. 5) of the directional pattern of each antenna element of the receiving antenna 2 (see FIG. 3) and the directional pattern of the transmitting antenna 13 (see FIG. 4).

In this case, because the main beam of the fixed synthetic pattern illustrated in FIG. 5 is fixed at 0°, where the angle of the main beam in the theoretical DBF synthetic pattern illustrated in FIG. 6 is 0°, the angle of the main beam of the final DBF synthetic pattern illustrated in FIG. 7 also becomes 0° accurately. Therefore, no correction is necessary.

When the angle of the main beam in the theoretical DBF synthetic pattern is not 0°, the shape of the main beam in the DBF synthetic pattern becomes asymmetric with respect to the center line because of influence of the fixed synthetic pattern and the center of the main beam is shifted to 0° direction.

Figure 9:
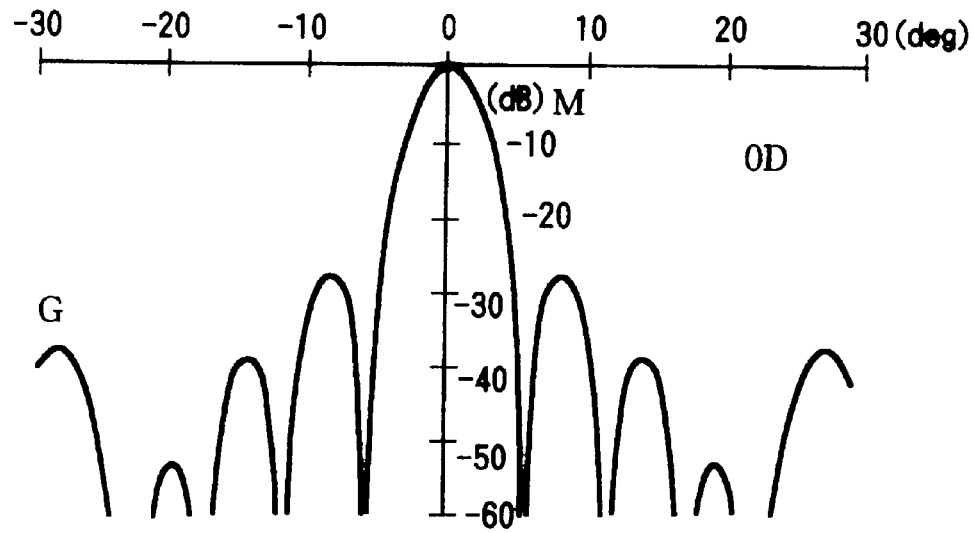
FIG. 9 is a graph to show the final DBF synthetic pattern when the theoretical angle of the main beam is 0°.
Figure 10:
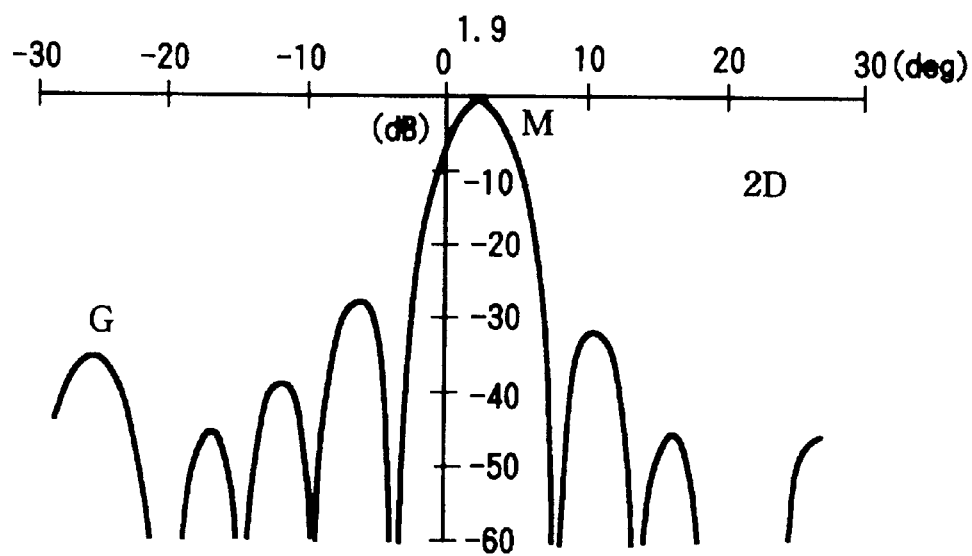
FIG. 10 is a graph to show the final DBF synthetic pattern when the theoretical angle of the main beam is 2°.
Figure 11:
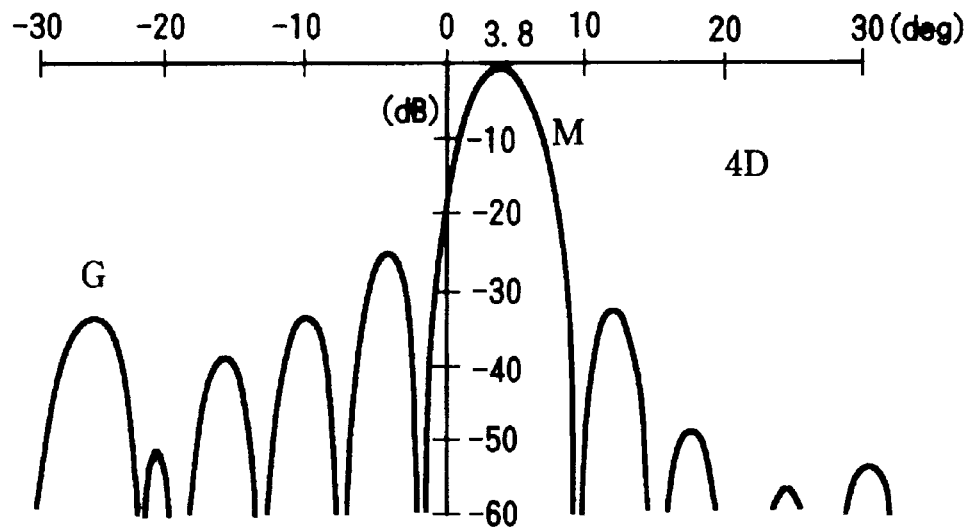
FIG. 11 is a graph to show the final DBF synthetic pattern when the theoretical angle of the main beam is 4°.
Figure 12:
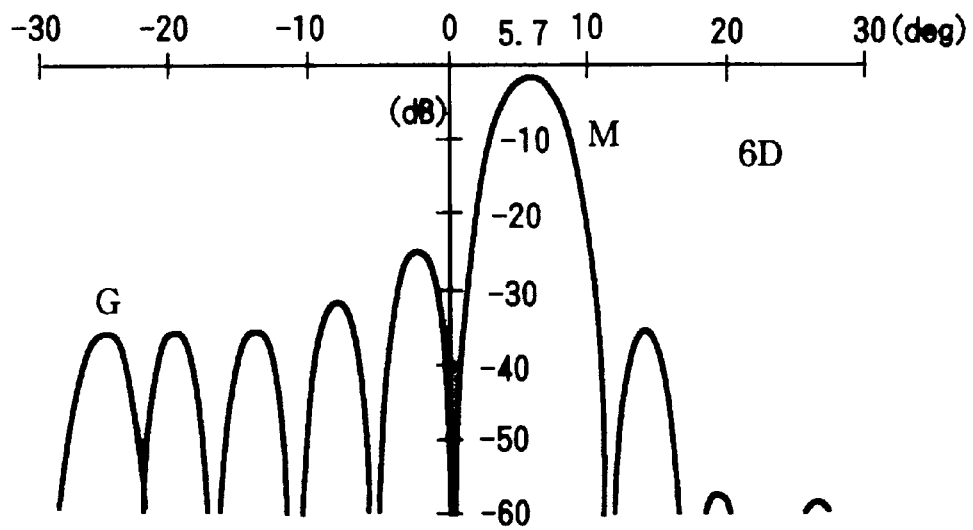
FIG. 12 is a graph to show the final DBF synthetic pattern when the theoretical angle of the main beam is 6°.

FIG. 9 to FIG. 12 show states of the shift of the final DBF synthetic pattern depending upon angles of the main beam, based on simulation results. FIG. 9 shows the final DBF synthetic pattern with 0° of the angle of the main beam in the theoretical DBF synthetic pattern, FIG. 10 that with 2°, FIG. 11 that with 4°, and FIG. 12 that with 6°.

It is seen from the simulation results that when the angle of the main beam of the theoretical DBF synthetic pattern is 2°, the angle of the main beam of the final DBF synthetic pattern resulting from the synthesis with the fixed synthetic pattern becomes 1.9°; when the angle of the main beam of the theoretical DBF synthetic pattern is 4°, the angle of the main beam of the final DBF synthetic pattern becomes 3.8°; when the angle of the main beam of the theoretical DBF synthetic pattern is 6°, the angle of the main beam of the final DBF synthetic pattern becomes 5.7°; and that the shift amounts thereof increase with increasing angle.

Figure 13:
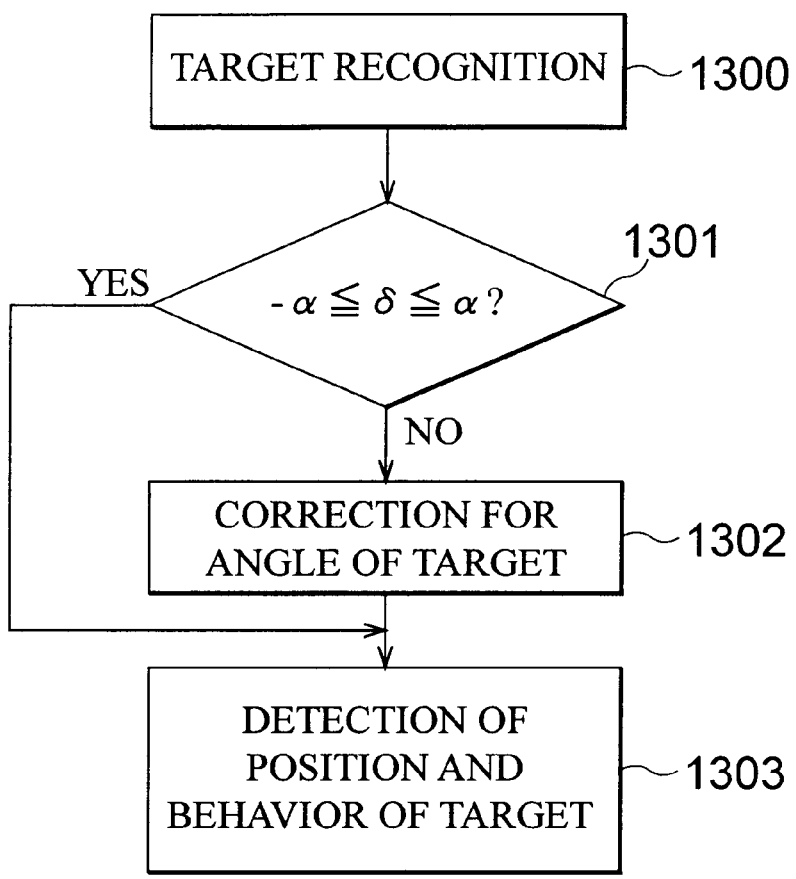
FIG. 13 is a flowchart to show the operation of the correction for the angle of the main beam.

In the present embodiment, the correction for the peak angle of the main beam, shown in the subroutine flowchart of FIG. 13, is thus carried out in the DBF synthesis and object recognition operation in step 811 of FIG. 8.

Specifically, after the stage in which a target (object) is recognized (step 1300), an angle δ of the target is compared with a preset value α. (step 1301). When $-\alpha \leq \delta \leq \alpha$ is met, it is determined that the shift is small and no correction is needed, and then the flow goes to step 1303. When in step 1301 the target angle δ does not meet $-\alpha \leq \delta \leq \alpha$, the value of δ is corrected based on correction data preliminarily calculated by simulation or the like and then the flow goes to step 1303. In step 1303 the position and behavior of the target are detected, based on the target angle δ corrected if necessary, the distance to the target, and the relative velocity of the target. The value of α can be properly selected according to required accuracy or the like. This correction for the target angle decreases detection errors.

Since the radar apparatus of the present invention can adequately adjust the synthetic pattern of the directional pattern of each antenna element of the receiving antenna and the directional pattern of the transmitting antenna, the grating lobes in the DBF synthetic pattern of the receiving antenna can be suppressed without provision of a separate auxiliary antenna. This can prevent erroneous recognition of a target due to the grating lobes without increase in the size of the apparatus.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus comprising a transmitting antenna and a receiving antenna, said receiving antenna being an array antenna having a plurality of antenna elements, said radar apparatus being adapted for carrying out the forming and scanning of an antenna beam of said receiving antenna according to a digital beamforming operation, and each of said plurality of antenna elements being comprised of a plurality of elemental antennas so as to have a predetermined directional pattern, wherein a synthetic pattern of the directional pattern of each of said antenna elements and a directional pattern of said transmitting antenna has a depressed shape of relative power at an angle where a grating lobe of said receiving antenna appears, and said forming and scanning of the antenna beam of said receiving antenna is carried out under the assumption that each of said antenna elements has a non-directional pattern, and a directional angle of a main beam is obtained by correcting an angle of the main beam computed under said assumption with a correction value previously determined according to the computed angle.

2. The radar apparatus according to claim 1, wherein said transmitting antenna is comprised of a plurality of elemental antennas.

3. An electronic scanning method for use in a radar apparatus comprising:

transmitting a transmit signal from a transmitting antenna;
receiving a receive signal in a receiving antenna, said receiving antenna being an array antenna having a plurality of antenna elements, each of said plurality of antenna elements being comprised of a plurality of elemental antennas so as to have a predetermined directional pattern, wherein a synthetic pattern of the directional pattern of each of said antenna elements and a directional pattern of said transmitting antenna has a depressed shape of relative power at an angle where a grating lobe of said receiving antenna appears;

scanning an antenna beam of said receiving antenna according to a digital beamforming operation under the assumption that each of said antenna elements has a non-directional pattern;

computing an angle of a main beam under said assumption; and determining a directional angle of the main beam by correcting the computed angle using a correction value previously determined according to the computed angle.

* * * * *